US012786627B2

(12) United States Patent
Dobos et al.

(10) Patent No.: US 12,786,627 B2
(45) Date of Patent: Nov. 3, 2026

(54) MICROPHONE ARRANGEMENT

(71) Applicant: Harman Becker Automotive Systems, GmbH, Karlsbad (DE)

(72) Inventors: Viktor Dobos, Kecskemét (HU); Balazs Varga, Galgaheviz (HU); Daniel Hajdu, Budapest (HU); Darin Krajewski, White Lake, MI (US); Rego Szilagyi, Gárdony (HU)

(73) Assignee: Harman Becker Automotive Systems GmbH, Karlsbad-Ittersbach (DE)

( * ) Notice: Subject to any disclaimer, the term of this patent is extended or adjusted under 35 U.S.C. 154(b) by 117 days.

(21) Appl. No.: 18/988,823

(22) Filed: Dec. 19, 2024

(65) Prior Publication Data

US 2025/0267404 A1 Aug. 21, 2025

(30) Foreign Application Priority Data

Feb. 20, 2024 (EP) .................................... 24158627

(51) Int. Cl.
*H04R 3/06* (2006.01)
*H04R 1/24* (2006.01)
(Continued)

(52) U.S. Cl.
CPC ............... *H04R 3/06* (2013.01); *H04R 1/245* (2013.01); *H04R 3/005* (2013.01); *H04R 19/016* (2013.01); *H04R 2201/003* (2013.01)

(58) Field of Classification Search
CPC .......... H04R 3/06; H04R 3/005; H04R 1/245; H04R 19/016; H04R 2201/003
(Continued)

(56) References Cited

U.S. PATENT DOCUMENTS 5,058,170 A * 10/1991 Kanamori ............. H04R 3/005 381/92
7,471,798 B2 * 12/2008 Warren ............... H04R 29/006 367/121

(Continued)

FOREIGN PATENT DOCUMENTS

EP 0869697 A2 10/1998
EP 2514218 B1 10/2014

(Continued)

*Primary Examiner* — William A Jerez Lora
(74) *Attorney, Agent, or Firm* — Angela M. Brunetti

(57) ABSTRACT

A microphone arrangement comprises an omnidirectional microphone providing a first microphone output signal (s1[*n*]), a unidirectional microphone providing a second microphone output signal (s2[*n*]), a first filter unit and an adder configured to provide a microphone arrangement output signal (sout[n]) by summing a filtered first microphone output signal (s1'[*n*]) and either the second microphone output signal or a filtered second microphone output signal (s2'[*n*]) provided by a second filter unit. The first filter unit removes the mid-frequency range component from the first microphone output signal (s1[*n*]) such that the filtered first microphone output signal (s1'[*n*]) only comprises the low frequency range and the high frequency range components. The second filter unit is configured to remove the low frequency and/or the high frequency range components from the second microphone output signal (s2[*n*]).

12 Claims, 2 Drawing Sheets

(51) Int. Cl.
*H04R 3/00* (2006.01)
*H04R 19/01* (2006.01)

(58) Field of Classification Search
USPC ................................................ 381/91, 92, 99
See application file for complete search history.

(56) References Cited

U.S. PATENT DOCUMENTS

| | | | | |
|---|---|---|---|---|
| 2012/0048033 | A1* | 3/2012 | Belotserkovsky | G01F 1/666<br>73/861.18 |
| 2016/0379664 | A1* | 12/2016 | Chen | H04R 1/326<br>381/94.3 |

FOREIGN PATENT DOCUMENTS

| | | | |
|---|---|---|---|
| EP | 3864858 | B1 | 7/2023 |
| EP | 4262233 | A1 | 10/2023 |

* cited by examiner

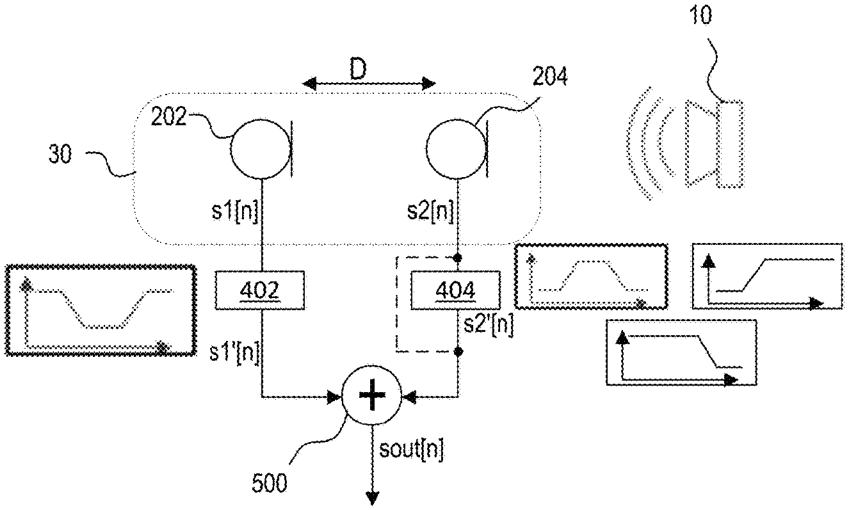

FIG 3

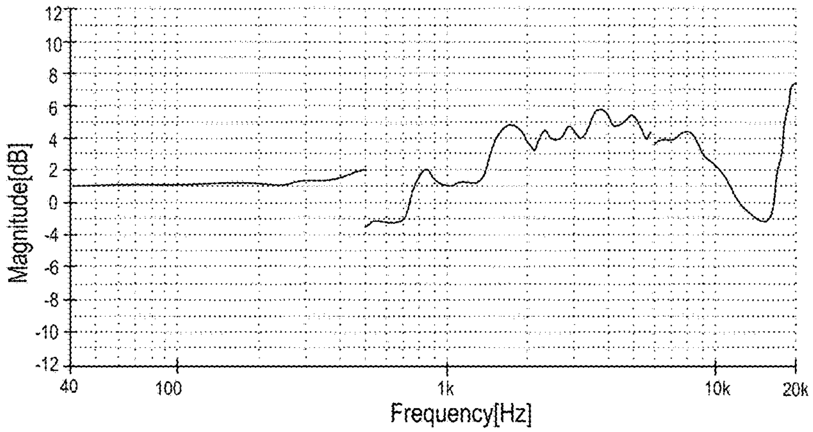

FIG 4 providing a first microphone output signal by means of an omnidirectional microphone, the first microphone output signal comprising a low frequency range, a mid-frequency range, and a high frequency range component 501

↓ providing a second microphone output signal by means of an unidirectional microphone, the second microphone output signal comprising a low frequency range, a mid-frequency range, and a high frequency range component 502

↓ providing a filtered first microphone output signal by removing the mid-frequency range component from the first microphone output signal by means of a first filter unit 503

↓ providing a microphone arrangement output signal by summing the filtered first microphone output signal and either the second microphone output signal or a filtered second microphone output signal 504

FIG 5

MICROPHONE ARRANGEMENT

CROSS REFERENCE

Priority is claimed to application Ser. No. 24/158,627.0, filed Feb. 20, 2024, in Europe, the disclosure of which is incorporated in its entirety by reference.

TECHNICAL FIELD

The disclosure relates to a microphone arrangement, in particular to a microphone arrangement comprising a plurality of microphones.

BACKGROUND

For many applications, microphones are required to provide a flat frequency response across a wide frequency range. Automatic speech recognition applications, for example, often require a flat frequency response across a frequency range of between at least 80 Hz to 16 kHz. Unidirectional microphones, as compared to omnidirectional microphones, provide an increased signal-to-noise ratio by having a lower sensitivity in all directions except a main direction (e.g., a front facing direction). Directionality of a microphone arrangement can be achieved, for example, by arranging a plurality of microphone elements in a microphone array (beamforming array). While having several advantages as compared to omnidirectional microphones, unidirectional microphones, however, generally do not have a flat frequency response over the entire frequency range and therefore cannot easily be used in applications requiring both a beamforming capability as well as a flat frequency response across a wide frequency range.

SUMMARY

A microphone arrangement includes an omnidirectional microphone providing a first microphone output signal, a unidirectional microphone providing a second microphone output signal, a first filter unit, configured to provide a filtered first microphone output signal, and an adder, configured to provide a microphone arrangement output signal by summing the filtered first microphone output signal and either the second microphone output signal or a filtered second microphone output signal provided by a second filter unit, wherein the first microphone output signal includes a low frequency range, a mid-frequency range, and a high frequency range component, and the second microphone output signal includes a low frequency range, a mid-frequency range, and a high frequency range component, the first filter unit is configured to remove the mid-frequency range component from the first microphone output signal such that the filtered first microphone output signal only includes the low frequency range and the high frequency range components of the first microphone output signal, and the second filter unit is configured to remove the low frequency and/or the high frequency range components from the second microphone output signal such that either the filtered second microphone output signal only includes the mid-frequency range component of the second microphone output signal, or the filtered second microphone output signal includes the mid-frequency range component and either the low frequency or the high frequency range component of the second microphone output signal.

A method for operating a microphone arrangement includes providing a first microphone output signal by means of an omnidirectional microphone, providing a second microphone output signal by means of a unidirectional microphone, providing a filtered first microphone output signal by means of a first filter unit, and providing a microphone arrangement output signal by summing the filtered first microphone output signal and either the second microphone output signal or a filtered second microphone output signal provided by means of a second filter unit, wherein the first microphone output signal includes a low frequency range, a mid-frequency range, and a high frequency range component, and the second microphone output signal includes a low frequency range, a mid-frequency range, and a high frequency range component. Providing a filtered first microphone output signal by means of the first filter unit includes removing the mid-frequency range component from the first microphone output signal such that the filtered first microphone output signal only includes the low frequency range and the high frequency range components of the first microphone output signal, and providing a filtered second microphone output signal by means of the second filter unit includes removing the low frequency and/or the high frequency range components from the second microphone output signal such that either the filtered second microphone output signal only includes the mid-frequency range component of the second microphone output signal, or the filtered second microphone output signal includes the mid-frequency range component and either the low frequency or the high frequency range component of the second microphone output signal.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangements may be better understood with reference to the following description and drawings. The components in the figures are not necessarily to scale, emphasis instead being placed upon illustrating the principles of the invention. Moreover, in the figures, like referenced numerals designate corresponding parts throughout the different views.

FIG. 3 schematically illustrates a microphone arrangement according to embodiments of the disclosure;

FIG. 4 schematically illustrates a frequency response of the microphone arrangement of FIG. 3; and FIG. 5, in a flow chart, schematically illustrates a method for operating a microphone arrangement according to one example.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of an arrangement as illustrated in the accompanying figures. Such terms are provided for context and understanding of the disclosed embodiments.

Figure 1:
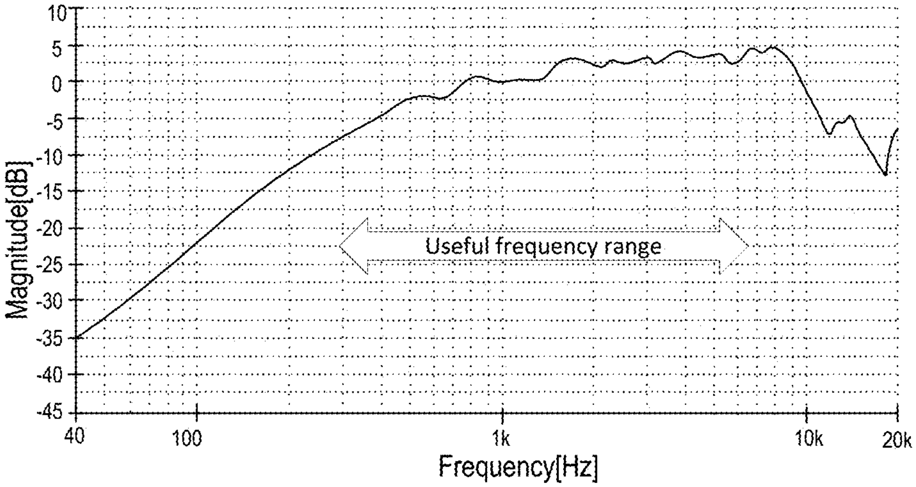
FIG. 1 schematically illustrates a frequency response of a unidirectional microphone.

Microphones are often desired to have a flat frequency response over a wide frequency range of, e.g., 20 Hz to 16 kHz or even up to 20 kHz. The frequency response of a microphone or microphone arrangement is usually defined as a quantitative measure of the magnitude of the output signal as a function of input frequency. In conventional unidirectional microphones or microphone arrangements, the frequency response may comprise variations of 50 dB or even more over the entire frequency range. A frequency response of a conventional unidirectional microphone is schematically illustrated in FIG. 1. In this example, the frequency response comprises a variation of about 40 dB over the entire frequency range.

A frequency response may be considered flat if variations over the entire frequency range are less than 10 dB, or even less than 5 dB. Flat frequency responses are often required for, e.g., automatic speech recognition applications. The frequency response, in the example of FIG. 1, can only be considered flat in a limited frequency range. In the example illustrated in FIG. 1, this limited frequency range is between about 300 Hz and about 7 kHz. This limited frequency range is designated as useful frequency range in FIG. 1. The useful frequency range may differ for different unidirectional microphones. A lower range of the useful frequency range may be 300 Hz, 400 Hz, or 800 Hz, for example. An upper range of the useful frequency range may be 4 kHz, 8 kHz, or 10 kHz, for example. Any other lower or upper ranges, however, are generally also possible, depending on the specific unidirectional microphone that is used.

Unidirectional (directional) microphones provide an increased signal-to-noise ratio by having a lower sensitivity in all but the main (i.e., front-facing) direction. Therefore, for many applications unidirectional microphones are preferred over omnidirectional microphones. Unidirectional microphones, however, due to physical limitations are usually limited in high and low frequencies. That is, without additional gain in these high and low frequency ranges, the unidirectional microphones generally cannot meet the requirements of, e.g., advanced voice recognition algorithms. Additional gain, however, negatively affects the signal-to-noise ratio, as it considerably raises noise levels at both low and high frequencies.

Figure 2:
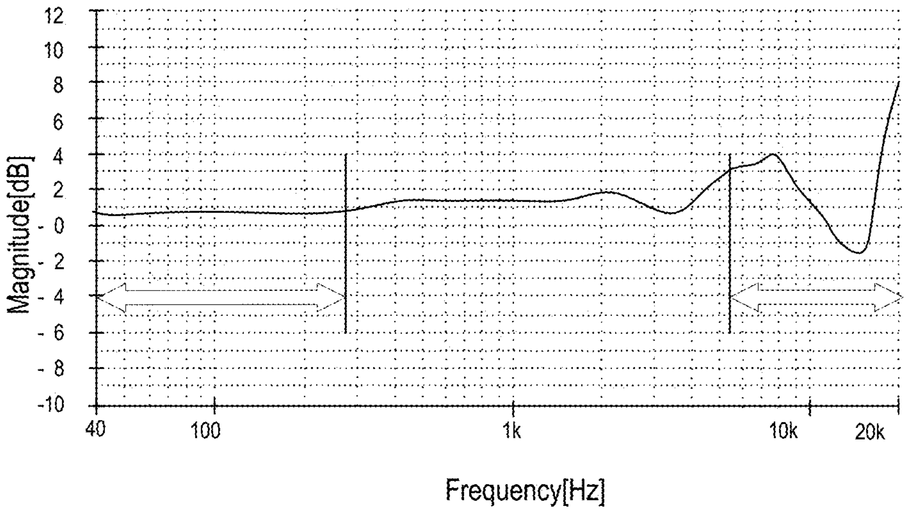
FIG. 2 schematically illustrates a frequency response of an omnidirectional microphone.

In order to keep the advantages of unidirectional microphones (e.g., high signal-to-noise ratio) while, at the same time, providing a flat frequency response over the required wide frequency range (e.g., between about 40 Hz/80 Hz and 16 kHz or even up to 20 kHz), a microphone system according to embodiments of the disclosure comprises an omnidirectional microphone in addition to the unidirectional microphone. As is schematically illustrated in FIG. 2, the frequency response of an omnidirectional microphone is generally considered flat at low frequencies and at high frequencies. That is, for example, a frequency response of an omnidirectional microphone is considered flat at frequencies of below about 300 Hz, and at frequencies of above about 7 kHz. The variations of the frequency response of an omnidirectional microphone are generally significantly less at high frequencies, as compared to the variations of the frequency response of a unidirectional microphone in the same frequency range. Referring to the examples illustrated in FIGS. 1 and 2, for example, a variation of the frequency response of the unidirectional microphone at frequencies of above 7 kHz is about 20 dB, while a variation of the frequency response of the omnidirectional microphone at frequencies of above 7 kHz is about 10 dB or even less.

In the following, examples of a microphone arrangement are described that has a flat superwide band frequency response. To achieve this, the system sums the low- and high-frequency range components of an omnidirectional microphone signal and a unidirectional microphone signal, the unidirectional microphone signal comprising either only the mid-frequency range component of a unidirectional microphone signal, or the mid-frequency range component and the low frequency range component and/or the high frequency range component of a unidirectional microphone signal. Referring to FIG. 3, a microphone arrangement according to embodiments of the disclosure is schematically illustrated. The microphone arrangement comprises an omnidirectional microphone 202 providing a first microphone output signal s1[*n*], a unidirectional microphone 204 providing a second microphone output signal s2[*n*], a first filter unit 402, configured to provide a filtered first microphone output signal s1'[*n*], and an adder 500, configured to provide a microphone arrangement output signal sout[n] by summing the filtered first microphone output signal s1'[*n*] and either the second microphone output signal s2[*n*] or a filtered second microphone output signal s2'[*n*] provided by an (optional) second filter unit 404. The first microphone output signal s1[*n*] comprises a low frequency range, a mid-frequency range, and a high frequency range component, and the second microphone output signal s2[*n*] comprises a low frequency range, a mid-frequency range, and a high frequency range component. The first filter unit 402 is configured to remove the mid-frequency range component from the first microphone output signal s1[*n*] such that the filtered first microphone output signal s1'[*n*] only comprises the low frequency range and the high frequency range components of the first microphone output signal s1[*n*]. If the filtered first microphone output signal s1'[*n*] is added to the second microphone output signal s2[*n*], the second filter unit 404 may either be bypassed (indicated in dashed lines in FIG. 3), or the second filter unit 404 may entirely be omitted. In a microphone arrangement comprising a second filter unit 404, the second filter unit 404 is configured to remove the low frequency and/or the high frequency range components from the second microphone output signal s2[*n*] such that either the filtered second microphone output signal s2'[*n*] only comprises the mid-frequency range component of the second microphone output signal s2[*n*], or the filtered second microphone output signal s2'[*n*] comprises the mid-frequency range component and the low frequency range component and/or the high frequency range component of the second microphone output signal s2[*n*].

That is, providing a microphone arrangement output signal sout[n] by summing the filtered first microphone output signal s1'[*n*] and the (filtered) second microphone output signal s2[*n*], s2'[*n*] comprises combining the low frequency range and the high frequency range components of the first microphone output signal s1[*n*] (of the omnidirectional microphone 202) either with only the mid-frequency range component of the second microphone output signal s2[*n*] or with the mid-frequency range component and the low frequency range component and/or the high frequency range component of the second microphone output signal s2[n] (of the unidirectional microphone 204). The resulting microphone arrangement output signal sout[n] therefore can be considered a mixed signal which comprises the low frequency range and the high frequency range components of the first microphone output signal s1[n] and the mid-frequency range component of the second microphone output signal s2[n], and optionally also the low frequency range component and/or the high frequency range component of the second microphone output signal s2[n]. In all cases, the frequency response of the resulting microphone arrangement output signal sout[n] is flat. A frequency response that is flatter than the frequency response of a unidirectional microphone may be achieved if the low frequency range and the high frequency range components of the first microphone output signal s1[n] are added to the unfiltered second microphone output signal s2[n]. An especially flat frequency response, however, may be achieved if the low frequency range and the high frequency range components of the first microphone output signal s1[n] are added to only the mid-frequency range component of the second microphone output signal s2[n], as is schematically illustrated in FIG. 4. As can be seen, in this case the frequency response remains between about −4 dB and +8 dB for all frequencies between 40 Hz and about 20 kHz. The frequency response of a conventional unidirectional microphone array 20 generally has low and high frequency sensitivity drops, as has been described with respect to FIG. 1 above. With the exemplary microphone arrangements described herein, it is possible to counteract these low and high frequency sensitivity drops, resulting in a flat frequency response over the entire frequency range. Not filtering the second microphone output signal s2[n] at all, or only removing either the low frequency range component or the high frequency range component is generally possible, but may only be restricted to certain special cases, as it may not always result in a microphone arrangement output signal sout[n] that meets the requirements of a flat frequency response over a wide frequency range.

An omnidirectional microphone generally is a microphone that picks up sound with equal gain from all sides or directions. A unidirectional microphone 204 picks up sound with a high gain from only one specific direction. The omnidirectional microphone 202 and the unidirectional microphone 204 pick up sound from a sound source 10. The sound source 10 may be a person or a loudspeaker, for example. Any other sound sources, however, are also possible.

The system may filter the first microphone output signal s1[n] and the second microphone output signal s2[n] using filters such as lowpass and highpass filters for the low and high-frequency components of the omnidirectional microphone 202, and a mid-frequency bandpass filter, a highpass filter or a lowpass filter for the unidirectional microphone 204, for example. That is, the first filter unit 402 may comprise a lowpass filter and a highpass filter, and the second filter unit 404 may comprise a bandpass filter, a highpass filter, or a lowpass filter. This counteracts the low- and high-frequency sensitivity drops in the frequency response of the unidirectional microphone 204.

The omnidirectional microphone 202 and the unidirectional microphone may be arranged as close together as possible. That is, a distance D between the omnidirectional microphone 202 and the unidirectional microphone 204 may be less than 5 cm, or even less than 2 cm. According to one example, and as is indicated with a dashed line in FIG. 3, the omnidirectional microphone 202 and the unidirectional microphone 204 may be arranged in one and the same housing 30. In this way, the microphone arrangement may be implemented very compact and small, and does not require a lot of space. The filter units 402, 404 may either be integrated in the same housing 30, or may be arranged outside of the housing 30. The same applies to the adder 500, which may either be arranged inside or outside of the housing 30.

The omnidirectional microphone 202 and the unidirectional microphone may generally be implemented in any suitable way. For example, the omnidirectional microphone 202 may comprise a micro-electromechanical system, MEMS, type microphone element, or an electret condenser, ECM, type microphone element. The same applies for the unidirectional microphone 204, which may comprise a micro-electromechanical system, MEMS, type microphone element, or an electret condenser, ECM, type microphone element. The different types of microphones may generally be combined in any way. For example, the omnidirectional microphone 202 and the unidirectional microphone 204 may both comprise a micro-electromechanical system, MEMS, type microphone element. According to another example, the omnidirectional microphone 202 and the unidirectional microphone 204 both comprise an electret condenser, ECM, type microphone element. According to an even further example, the omnidirectional microphone 202 comprises an electret condenser, ECM, type microphone element, and the unidirectional microphone 203 comprises a micro-electromechanical system, MEMS, type microphone element. However, if, according to an even further example, the omnidirectional microphone 202 comprises a micro-electromechanical system, MEMS, type microphone element, and the unidirectional microphone 204 comprises an electret condenser, ECM, type microphone element, the microphone arrangement may be implemented in a very compact and space saving way. This is, because a MEMS type omnidirectional microphone may generally be integrated with an ECM type unidirectional microphone in a very compact and space saving way.

The omnidirectional microphone 202 may comprise a single (only one/not more than one) microphone element. The unidirectional microphone 204 may also only comprise a single (only one/not more than one) microphone element. However, if there is enough space, the unidirectional microphone 204, for example, may comprise an array of at least two microphone elements instead. Each of the at least two microphone elements may be an omnidirectional microphone element, for example. A directional output signal of such a microphone array may be obtained by means of suitable signal processing techniques, which are generally known and will not be described in further detail herein.

For the first microphone output signal s1[n] and the second microphone output signal s2[n] the following may apply: the low frequency component includes frequencies of below 300 Hz, below 400 Hz, or below 800 Hz, the mid-frequency component includes frequencies of between 300 Hz, 400 Hz or 800 Hz and 4 kHz, 8 kHz, or 10 kHz, and the high frequency component includes frequencies of more than 4 kHz, more than 8 kHz, or more than 10 kHz.

Summarizing the above, the exemplary microphone arrangements provide a superwide band frequency characteristic without sacrificing sound-to-noise ratio by adding noise at low and high frequency bands. The frequency responses as exemplarily illustrated in the figures and as described herein are merely examples. Generally, the course of the frequency response over the frequency range depends on several different factors and may differ for different microphones.

Now referring to FIG. 5, a method according to embodiments of the disclosure is schematically illustrated. The method comprises providing a first microphone output signal s1[*n*] by means of an omnidirectional microphone 202 (step 501), providing a second microphone output signal s2[*n*] by means of a unidirectional microphone 204 (step 502), providing a filtered first microphone output signal s1'[*n*] by means of a first filter unit 402 (step 503), and providing a microphone arrangement output signal sout[n] by summing the filtered first microphone output signal s1'[*n*] and either the second microphone output signal or a filtered second microphone output signal s2'[*n*] provided by means of a second filter unit (step 504). The first microphone output signal s1[*n*] comprises a low frequency range, a mid-frequency range, and a high frequency range component, and the second microphone output signal s2[*n*] comprises a low frequency range, a mid-frequency range, and a high frequency range component. Providing a filtered first microphone output signal s1'[*n*] by means of the first filter unit 402 comprises removing the mid-frequency range component from the first microphone output signal s1[*n*] such that the filtered first microphone output signal s1'[*n*] only comprises the low frequency range and the high frequency range components of the first microphone output signal s1[*n*], and providing a filtered second microphone output signal s2'[*n*] by means of the second filter unit 404 comprises removing the low frequency and/or the high frequency range components from the second microphone output signal s2[*n*] such that either the filtered second microphone output signal s2'[*n*] only comprises the mid-frequency range component of the second microphone output signal s2[*n*], or the filtered second microphone output signal s2'[*n*] comprises the mid-frequency range component and either the low frequency range component or the high frequency range component of the second microphone output signal s2[*n*].

Providing a filtered first microphone output signal s1'[*n*] by means of the first filter unit 402 may comprise removing the mid-frequency range component from the first microphone output signal s1[*n*] by means of a lowpass filter and a highpass filter, and providing a filtered second microphone output signal s2'[*n*] by means of the second filter unit 404 may either comprise removing the low frequency and the high frequency range components from the second microphone output signal s2[*n*] by means of a bandpass filter, or removing the low frequency range components from the second microphone output signal s2[*n*] by means of a highpass filter, or removing the high frequency range components from the second microphone output signal by means of a lowpass filter.

Providing a microphone arrangement output signal sout [n] by summing the filtered first microphone output signal s1'[*n*] and either the second microphone output signal s2[*n*] or the filtered second microphone output signal s2'[*n*] may comprise combining the low frequency range and the high frequency range components of the first microphone output signal s1[*n*] either with the mid-frequency range component of the second microphone output signal s2[*n*], or with the mid-frequency range component and at least one of the low frequency range component and the high frequency range component of the second microphone output signal s2[*n*].

For the first microphone output signal s1[*n*] and the second microphone output signal s2[*n*] the following my apply: the low frequency component includes frequencies of below 300 Hz, below 400 Hz, or below 800 Hz, the mid-frequency component includes frequencies of between 300 Hz, 400 Hz or 800 Hz and 4 kHz, 8 kHz, or 10 kHz, and the high frequency component includes frequencies of more than 4 kHz, more than 8 kHz, or more than 10 kHz.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should not be understood as excluding the plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly disclose subject matter from the above description that is regarded to be novel and non-obvious.

The invention claimed is:

1. A microphone arrangement comprising:

an omnidirectional microphone providing a first microphone output signal (s1[*n*]);

a unidirectional microphone providing a second microphone output signal (s2[*n*]);

a first filter unit configured to provide a filtered first microphone output signal (s1'[*n*]);

an adder configured to provide a microphone arrangement output signal (sout[n]) by summing the filtered first microphone output signal (s1'[*n*]) and either the second microphone output signal (s2[*n*]) or a filtered second microphone output signal (s2'[*n*]) provided by a second filter unit;

the first microphone output signal (s1[*n*]) comprises a low frequency range, a mid-frequency range, and a high frequency range component, and the second microphone output signal (s2[*n*]) comprises a low frequency range, a mid-frequency range, and a high frequency range component;

the first filter unit (402) is configured to remove the mid-frequency range component from the first microphone output signal (s1[*n*]) such that the filtered first microphone output signal (s1'[*n*]) only comprises the low frequency range and the high frequency range components of the first microphone output signal (s1 [*n*]); and the second filter unit is configured to remove the low frequency and/or the high frequency range components from the second microphone output signal (s2[*n*]) such that either the filtered second microphone output signal (s2'[*n*]) only comprises the mid-frequency range component of the second microphone output signal (s2[*n*]), or the filtered second microphone output signal (s2'[*n*]) comprises the mid-frequency range component and either the low frequency or the high frequency range component of the second microphone output signal (s2[*n*]).

2. The microphone arrangement of claim 1, wherein the first filter unit comprises a lowpass filter and a highpass filter, and the second filter unit comprises one of a bandpass filter, a lowpass filter, and a highpass filter.

3. The microphone arrangement of claim 1, wherein a distance (D) between the omnidirectional microphone and the unidirectional microphone is less than 5 cm, or less than 2 cm.

4. The microphone arrangement of claim 1, wherein the omnidirectional microphone and the unidirectional microphone are arranged in one and the same housing.

5. The microphone arrangement of claim 1, wherein the omnidirectional microphone comprises a micro-electromechanical system, MEMS, type microphone element, and the unidirectional microphone comprises an electret condenser, ECM, type microphone element.

6. The microphone arrangement of claim 1, wherein the unidirectional microphone comprises an array of at least two microphone elements.

7. The microphone arrangement of claim 6, wherein each of the at least two microphone elements is an omnidirectional microphone element.

8. The microphone arrangement of claim 1, wherein for the first microphone output signal (s1[*n*]) and the second microphone output signal (s2[*n*]) the following applies:

the low frequency range component includes frequencies of below 300 Hz, below 400 Hz, or below 800 Hz;

the mid-frequency range component includes frequencies of between 300 Hz, 400 Hz or 800 Hz and 4 kHz, 8 kHz, or 10 kHz; and the high frequency range component includes frequencies of more than 4 kHz, more than 8 kHz, or more than 10 kHz.

9. A method for operating a microphone arrangement, the method comprising:

providing a first microphone output signal (s1[*n*]) by means of an omnidirectional microphone;

providing a second microphone output signal (s2[*n*]) by means of a unidirectional microphone;

providing a filtered first microphone output signal (s1'[*n*]) by means of a first filter unit;

providing a microphone arrangement output signal (sout[n]) by summing the filtered first microphone output signal (s1'[*n*]) and either the second microphone output signal (s2[*n*]) or a filtered second microphone output signal (s2'[*n*]) provided by means of a second filter unit;

the first microphone output signal (s1[*n*]) comprises a low frequency range, a mid-frequency range, and a high frequency range component, and the second microphone output signal (s2[*n*]) comprises a low frequency range, a mid-frequency range, and a high frequency range component;

providing a filtered first microphone output signal (s1'[*n*]) by means of the first filter unit comprises removing the mid-frequency range component from the first microphone output signal (s1[*n*]) such that the filtered first microphone output signal (s1'[*n*]) only comprises the low frequency range and the high frequency range components of the first microphone output signal (s1[*n*]); and providing a filtered second microphone output signal (s2'[*n*]) by means of the second filter unit comprises removing the low frequency and/or the high frequency range components from the second microphone output signal (s2[*n*]) such that either the filtered second microphone output signal (s2'[*n*]) only comprises the mid-frequency range component of the second microphone output signal (s2[*n*]), or the filtered second microphone output signal (s2'[*n*]) comprises the mid-frequency range component and either the low frequency or the high frequency range component of the second microphone output signal (s2[*n*]).

10. The method of claim 9, wherein providing a filtered first microphone output signal (s1'[*n*]) by means of the first filter unit comprises removing the mid-frequency range component from the first microphone output signal (s1[*n*]) by means of a lowpass filter and a highpass filter; and providing a filtered second microphone output signal (s2'[*n*]) by means of the second filter unit either comprises removing the low frequency and the high frequency range components from the second microphone output signal (s2[*n*]) by means of a bandpass filter, or removing the low frequency range components from the second microphone output signal (s2[*n*]) by means of a highpass filter, or removing the high frequency range components from the second microphone output signal (s2[*n*]) by means of a lowpass filter.

11. The method of claim 9, wherein providing a microphone arrangement output signal (sout[n]) by summing the filtered first microphone output signal (s1'[*n*]) and either the second microphone output signal (s2[*n*]) or the filtered second microphone output signal (s2'[*n*]) comprises combining the low frequency range and the high frequency range components of the first microphone output signal (s1[*n*]) either with the mid-frequency range component of the second microphone output signal (s2[*n*]), or with the mid-frequency range component and at least one of the low frequency range and the high frequency range component of the second microphone output signal (s2[*n*]).

12. The method of claim 9, wherein for the first microphone output signal (s1[*n*]) and the second microphone output signal (s2[*n*]) the following applies:

the low frequency range component includes frequencies of below 300 Hz, below 400 Hz, or below 800 Hz;

the mid-frequency range component includes frequencies of between 300 Hz, 400 Hz or 800 Hz and 4 kHz, 8 kHz, or 10 kHz; and the high frequency range component includes frequencies of more than 4 kHz, more than 8 kHz, or more than 10 kHz.

* * * * *